(12) United States Patent
Krig

(10) Patent No.: US 8,752,191 B2
(45) Date of Patent: Jun. 10, 2014

(54) GENERIC DIGITAL RIGHTS MANAGEMENT FRAMEWORK, AND APPLICATIONS THEREOF

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 473 days.

(21) Appl. No.: 12/121,636

(22) Filed: May 15, 2008

(65) Prior Publication Data

US 2009/0083429 A1    Mar. 26, 2009

Related U.S. Application Data

(60) Provisional application No. 60/924,479, filed on May 16, 2007.

(51) Int. Cl.
*G06F 21/00* (2013.01)

(52) U.S. Cl.
USPC .............................................. 726/27; 705/57

(58) Field of Classification Search
USPC ................ 726/26, 27, 29; 709/200, 201–203, 709/217–219, 223–232
See application file for complete search history.

(56) References Cited

U.S. PATENT DOCUMENTS

| | | | |
|---|---|---|---|
| 7,120,429 B2 | 10/2006 | Minear et al. | |
| 7,191,332 B1 | 3/2007 | Pankajakshan et al. | |
| 7,196,661 B2 * | 3/2007 | Harvey | 342/357.75 |
| 7,457,781 B1 | 11/2008 | Weaver et al. | |
| 7,484,103 B2 * | 1/2009 | Woo et al. | 713/189 |
| 7,493,289 B2 | 2/2009 | Verosub et al. | |
| 7,555,554 B2 * | 6/2009 | Manders et al. | 709/227 |
| 7,584,222 B1 * | 9/2009 | Georgiev | 1/1 |
| 7,747,533 B2 | 6/2010 | Zhang et al. | |
| 7,779,097 B2 * | 8/2010 | Lamkin et al. | 709/223 |
| 7,861,312 B2 | 12/2010 | Lee et al. | |
| 2002/0049679 A1 | 4/2002 | Russell et al. | |
| 2002/0157002 A1 * | 10/2002 | Messerges et al. | 713/155 |
| 2003/0028488 A1 | 2/2003 | Mohammed et al. | |
| 2003/0032406 A1 | 2/2003 | Minear et al. | |
| 2003/0131353 A1 * | 7/2003 | Blom et al. | 725/25 |
| 2003/0135756 A1 | 7/2003 | Verma | |
| 2004/0037288 A1 * | 2/2004 | Bourgart et al. | 370/395.1 |
| 2004/0139315 A1 * | 7/2004 | Tokutani et al. | 713/156 |
| 2004/0221044 A1 * | 11/2004 | Rosenbloom et al. | 709/227 |
| 2004/0221163 A1 | 11/2004 | Jorgensen et al. | |
| 2004/0249768 A1 * | 12/2004 | Kontio et al. | 705/65 |

(Continued)

OTHER PUBLICATIONS

Office Action, dated Jun. 11, 2010, for U.S. Appl. No. 11/967,939, filed Dec. 31, 2007, 17 pages.
Office Action, dated Jan. 3, 2011, for U.S. Appl. No. 11/967,939, filed Dec. 31, 2007, 5 pages.
Office Action, dated Jun. 21, 2011, for U.S. Appl. No. 11/967,939, filed Dec. 31, 2007, 5 pages.
Office Action, dated Jun. 11, 2010, for U.S. Appl. No. 11.967,990, filed Dec. 31, 2007, 15 pages.

(Continued)

*Primary Examiner* — Gilberto Barron, Jr.
*Assistant Examiner* — Abdulhakim Nobahar
(74) *Attorney, Agent, or Firm* — Sterne, Kessler, Goldstein & Fox PLLC

(57) ABSTRACT

Methods, systems and computer program products to implement generic Digital Rights Management (DRM) are provided herein. The methods include opening a session between an initiator and a responder, exchanging one or more of device and system information and sending one of an operation or event based on DRM capabilities, DRM partner, DRM authority, DRM characteristics, DRM Trust and CCEVS profiles. The operation includes one or more of a dataset, response code, operation parameter and response parameter. These extensions may be in the form of one or more of an operation, an event, a dataset or property code.

40 Claims, 7 Drawing Sheets

(56) References Cited

U.S. PATENT DOCUMENTS

| | | | |
|---|---|---|---|
| 2005/0010531 | A1 | 1/2005 | Kushalnagar et al. |
| 2005/0268343 | A1* | 12/2005 | Onoda et al. ............... 726/26 |
| 2006/0021012 | A1 | 1/2006 | Ito |
| 2006/0053080 | A1 | 3/2006 | Edmonson et al. |
| 2006/0107046 | A1* | 5/2006 | Raley et al. ............... 713/168 |
| 2006/0149683 | A1 | 7/2006 | Shimojima et al. |
| 2006/0195864 | A1* | 8/2006 | New et al. ............... 725/25 |
| 2006/0253874 | A1* | 11/2006 | Stark et al. ............... 725/62 |
| 2006/0253894 | A1* | 11/2006 | Bookman et al. ............... 726/2 |
| 2006/0265758 | A1 | 11/2006 | Khandelwal et al. |
| 2007/0106551 | A1* | 5/2007 | McGucken ............... 705/10 |
| 2007/0136204 | A1* | 6/2007 | Oh et al. ............... 705/51 |
| 2007/0198430 | A1* | 8/2007 | Takahashi et al. ............... 705/59 |
| 2007/0206799 | A1 | 9/2007 | Wingert et al. |
| 2007/0208668 | A1* | 9/2007 | Candelore ............... 705/57 |
| 2008/0082813 | A1 | 4/2008 | Chow et al. |
| 2008/0086779 | A1 | 4/2008 | Blake et al. |
| 2008/0092211 | A1 | 4/2008 | Klemets et al. |
| 2008/0120242 | A1 | 5/2008 | Krig et al. |
| 2008/0127351 | A1 | 5/2008 | Jang et al. |
| 2008/0189348 | A1 | 8/2008 | Krig |
| 2008/0189349 | A1 | 8/2008 | Krig |
| 2008/0282316 | A1 | 11/2008 | Sonoda et al. |
| 2008/0288788 | A1 | 11/2008 | Krig |
| 2009/0150293 | A1 | 6/2009 | Yen et al. |

OTHER PUBLICATIONS

Office Action, dated Aug. 17, 2011, for U.S. Appl. No. 11/967,939, filed Dec. 31, 2007, 6 pages.
Office Action, dated Jan. 10, 2012, for U.S. Appl. No. 11/967,939, filed Dec. 31, 2007, 6 pages.
Office Action, dated Aug. 31, 2011, for U.S. Appl. No. 11/967,990, filed Dec. 31, 2007, 5 pages.
Office Action, dated Jan. 11, 2012, for U.S. Appl. No. 11/967,990, filed Dec. 31, 2007, 5 pages.
Office Action, dated Feb. 3, 2012, for U.S. Appl. No. 12/121,639, filed May 15, 2008, 7 pages.
Office Action, dated Jul. 27, 2012, for U.S. Appl. No. 12/121,639, filed May 15, 2008, 8 pages.
Office Action, dated Dec. 6, 2012, for U.S. Appl. No. 12/121,639, filed May 15, 2008, 7 pages.
Office Action, dated Apr. 1, 2013, for U.S. Appl. No. 12/121,639, filed May 15, 2008, 8 pages.
Examiner's Answer to Appeal Brief, dated Jul. 16, 2012, for U.S. Appl. No. 11/967,939, filed Dec. 31, 2007, 7 pages.
Office Action, dated Jun. 25, 2012, for U.S. Appl. No. 11/967,990, filed Dec. 31, 2007, 6 pages.
Notice of Allowance, mailed Jan. 6, 2014, for U.S. Appl. No. 12/121,639, filed May 15, 2008, 20 pages.

* cited by examiner

GENERIC DIGITAL RIGHTS MANAGEMENT FRAMEWORK, AND APPLICATIONS THEREOF

CROSS-REFERENCE TO RELATED APPLICATIONS

This application claims the benefit of U.S. Provisional Application No. 60/924,479 filed May 16, 2007 which is incorporated herein by reference in its entirety.

BACKGROUND OF THE INVENTION

1. Field of the Invention

The present invention generally relates to multimedia communication.

2. Background Art

Currently, multiple protocols for the transfer of objects or media objects such as audio, video, images and text are in use, one of them being the media transfer protocol (MTP). MTP is an extension of the industry standard picture transfer protocol (PTP). The media transfer protocol was created as an extension to the picture transfer protocol specifically for media devices and includes various provisions for digital rights management (DRM).

Current protocols may use digital rights management (DRM) and electronic license management technologies for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

However, current protocols such as MTP do not provide for effective digital rights management of media. Methods and systems are needed to overcome the above mentioned deficiencies.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
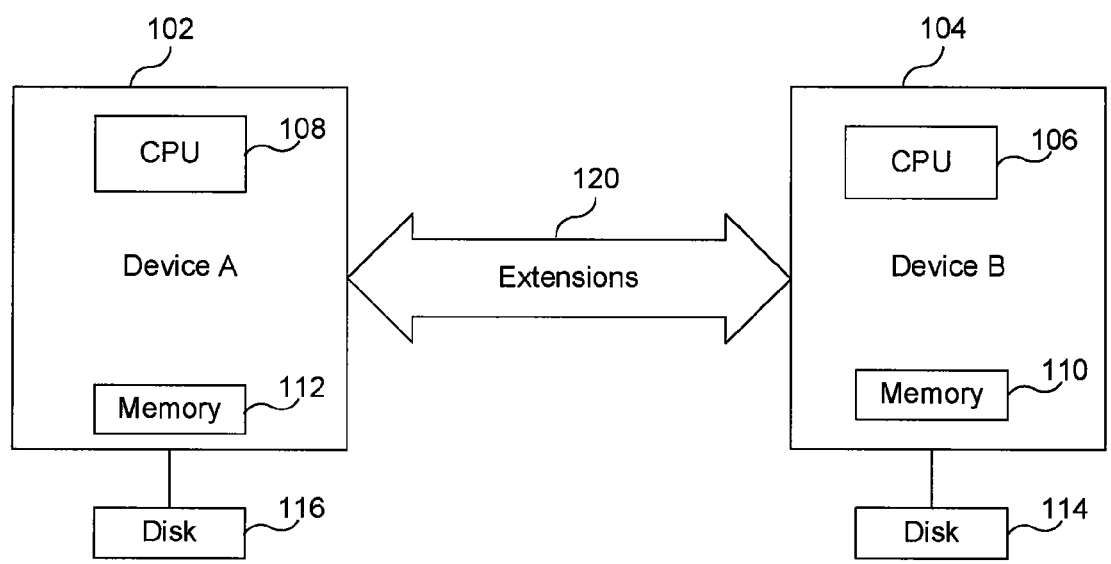
FIG. 1 is a block diagram of an exemplary system in accordance with an embodiment of the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

1. Overview
2. The Media Transport Protocol
3. An Example Operating Environment
4. Connections between an initiator and a responder
5. DRM Framework Components
    5a. DRM Framework Overview
    5b. DRM System and object Identification
    5c. DRM Protected Objects
    5d. DRM Management Objects
    5e. DRM Composite Objects
    5f. DRM License Object Secure Storage
    5g. DRM Component Transmission
6. DRM Management in Generic DRM framework
    6a. DRM Capability operation
    6b. DRM Partner Features
    6c. DRM Authority Features
    6d. DRM Trust Information
    6e. CCEVS Protection
7. Generic DRM Properties
    7a. DRM License Type Property
    7b. DRM Management Object Property
    7c. DRM License Object Corresponding ObjectID Property
    7d. DRM Protected Object Corresponding LicenceID Property
    7e. DRM Protected Object Corresponding ManagerID Property
    7f. DRM Corresponding CompositeID Property
    7g. Trusted Clock Property
8. Example General Purpose Computer System
9. Conclusion

1. Overview

The present invention provides apparatus and methods for generic Digital Rights Management (DRM). Extensions to protocols including but not limited to the media transfer protocol (MTP) are provided herein. Aspects of the method and system may comprise exchanging generic DRM properties for marking DRM components, generic DRM operations and datasets for exchanging DRM capabilities, DRM partner features, DRM authority information, trusted component information and CCEVS protection profiles. These extensions may be in the form of one or more of an operation, an event, a dataset or property code.

An operation as referred to herein may be sent by an initiator (as described below with reference to FIG. 1) or responder (described below with reference to FIG. 1). An operation either requests information or provides information in the form of a dataset or property. An operation may include but is not limited to an operation code field (arbitrary value based on design), multiple operation parameters fields, a data field that may include an optional dataset, a field for response code and a plurality of response parameters. The data direction field indicates the direction of data transfer, either from an initiator to a responder or from a responder to an initiator. Response codes include but are not limited to "OK" which indicates that the recipient of the operation accepts the operation, "parameter not supported" which indicates the either an operation or response parameter is not supported, "operation not supported" which indicates that the operation is not supported, "session not open" which indicates that a session is not open, "invalid transaction identification" which indicates that the transaction identification is invalid and "device busy" which indicates that the recipient of the operation is currently unavailable to service the requested operation.

An event as referred to herein may be sent by an initiator or responder and may include but is not limited to a field for event code, multiple fields for event parameters and a data field that may include an optional dataset. An event is used to notify of a change in status of the sending entity.

A property as referred to herein may be sent by an initiator or a responder and may include but is not limited to fields such as a "property code" that identifies the property, "data type" that indicates the data type of the property, "get/set" which indicates whether the responder is to return a value or set a value, "default value" which indicates the default value of the property, "group code" which indicates the group identifier and "form flag" which may be set by the sender of the property.

A dataset as referred to herein may be sent by an initiator or a responder and may include but is not limited to fields such as a "dataset field" that indicates the type of data, a "field order" that indicates the order of the type of data in the dataset, a "length" field that indicates the size of the data and a "datatype" field that indicates the data type of the data.

In an embodiment, each entry under the "dataset field" may be represented by a property, thus a dataset may alternatively be represented as multiple distinct properties. In embodiments, initiators and responders may exchange either entire datasets described herein or individual entries under the dataset field of a dataset that have been encapsulated as properties. For example, with reference to media player application information dataset in table 2, the "DRM System ID" entry may be represented by a "DRM System ID" property. Thus if only DRM system identification information is needed, the DRM system identification property can be sent instead of the entire dataset in table 2.

It is to be appreciated that the choice of fields to be included in operations, events and datasets to accomplish the methods described herein are a design choice and may be arbitrary.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

2. The Media Transfer Protocol (MTP)

The media transfer protocol (MTP) is an extension of the industry standard picture transfer protocol (PTP). The media transfer protocol was created as an extension to the picture transfer protocol specifically for media devices and includes various provisions for digital rights management (DRM).

Digital rights management (DRM) and electronic license management technologies may be utilized for home video, music, consumer and enterprise software markets. Motion picture studios, cable and satellite TV operators, consumer electronics companies and personal computer manufacturers use DRM technologies to prevent the unauthorized duplication, reception or use of copyrighted media such as video, audio, books, training courses, drawings, photographs or other media materials.

PIMA 15740:2000 provides a common communication mechanism for exchanging images with and between digital still photography devices (DSPDs). This includes communication between digital still photography devices and host computers, printers, other digital still devices, telecommunications kiosks, and image storage and display devices. This standard presents a protocol that is intended to be transport and platform independent. Exemplary transports include USB (Universal Serial Bus), IEEE 1394, and IrDA (Infrared Data Association).

The generic DRM extensions presented herein may be used with MTP or any other media transfer protocol.

3. Example Operating Environment

FIG. 1 is a block diagram of an exemplary system comprising a plurality of devices which are communicatively coupled and utilize one or more extensions of generic DRM, in accordance with an embodiment of the invention.

Referring to FIG. 1 there is shown one or more extensions 120 that facilitates communication between a device 102 and a device 104. Extensions 120 may be in the form of one or more of an operation, event or dataset. The system illustrated in FIG. 1 enables a method for transferring extensions 120 to and from device 102, which may be a host computer, and device 104 which may be a hand-held device.

The device 102 may comprise suitable logic, circuitry and/or code that may enable transfer of information to and from the device 104 via at least one extension 120. In one embodiment of the invention, the device 102 may be a host computer referred to as an "initiator", and that may handle the extensions 120 while exchanging for example, media content and messages with the device 104. Media content may be referred to as an "object" or "media object" herein and includes but is not limited to video, audio, images, e-books and any other type of data.

Figure 8:
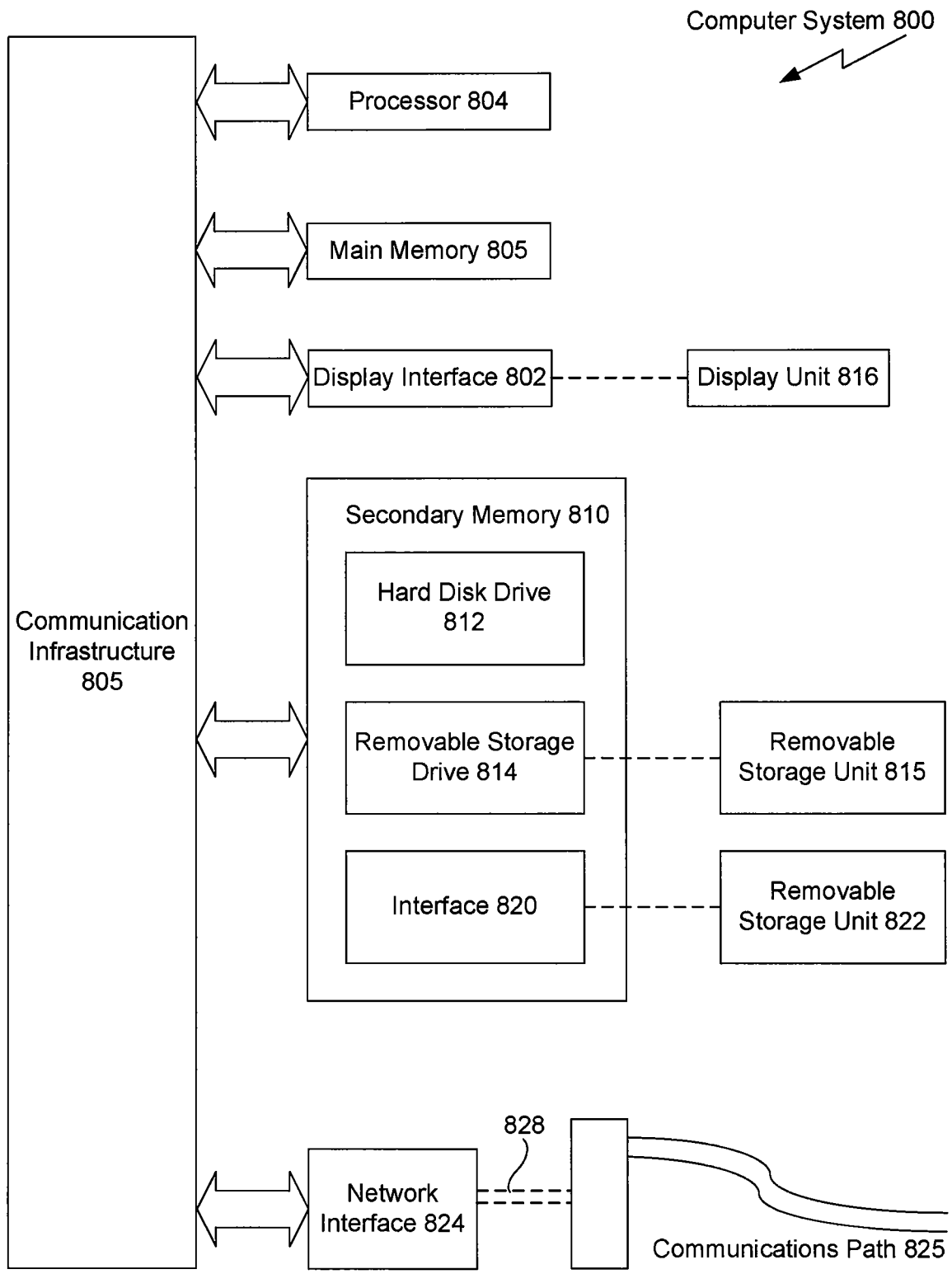
FIG. 8 is a block diagram of a computer system on which the present invention can be implemented.

The device 104 may comprise suitable logic, circuitry, and/or code that may enable the transfer of information to and from the device 102 at least one extension 120. In one embodiment of the invention, the device 104 may be a hand-held device referred to in the MTP specification as a "responder", and that may handle the extensions 120 while exchanging, for example, media content and messages with the device 102. It is to be appreciate that initiator 102 and responder 104 may be any computational device, including but not limited to one or more of a portable media player devices such as an Motion Picture Experts Group (MPEG) Audio Layer 3 (MP3) player, a mobile communications device such as a cellular phone, a Global Positioning Satellite (GPS) device such as a navigation system, a communications device such as a Wireless Fidelity (WiFi) or internet enabled communications device, a medical device or a device with an embedded controller. In an embodiment, initiator 102 or responder 104 may include computer system 800 or portions of computer system 800 as shown in FIG. 8 and described below.

4. Example Connection Between an Initiator and a Responder

Figure 2:
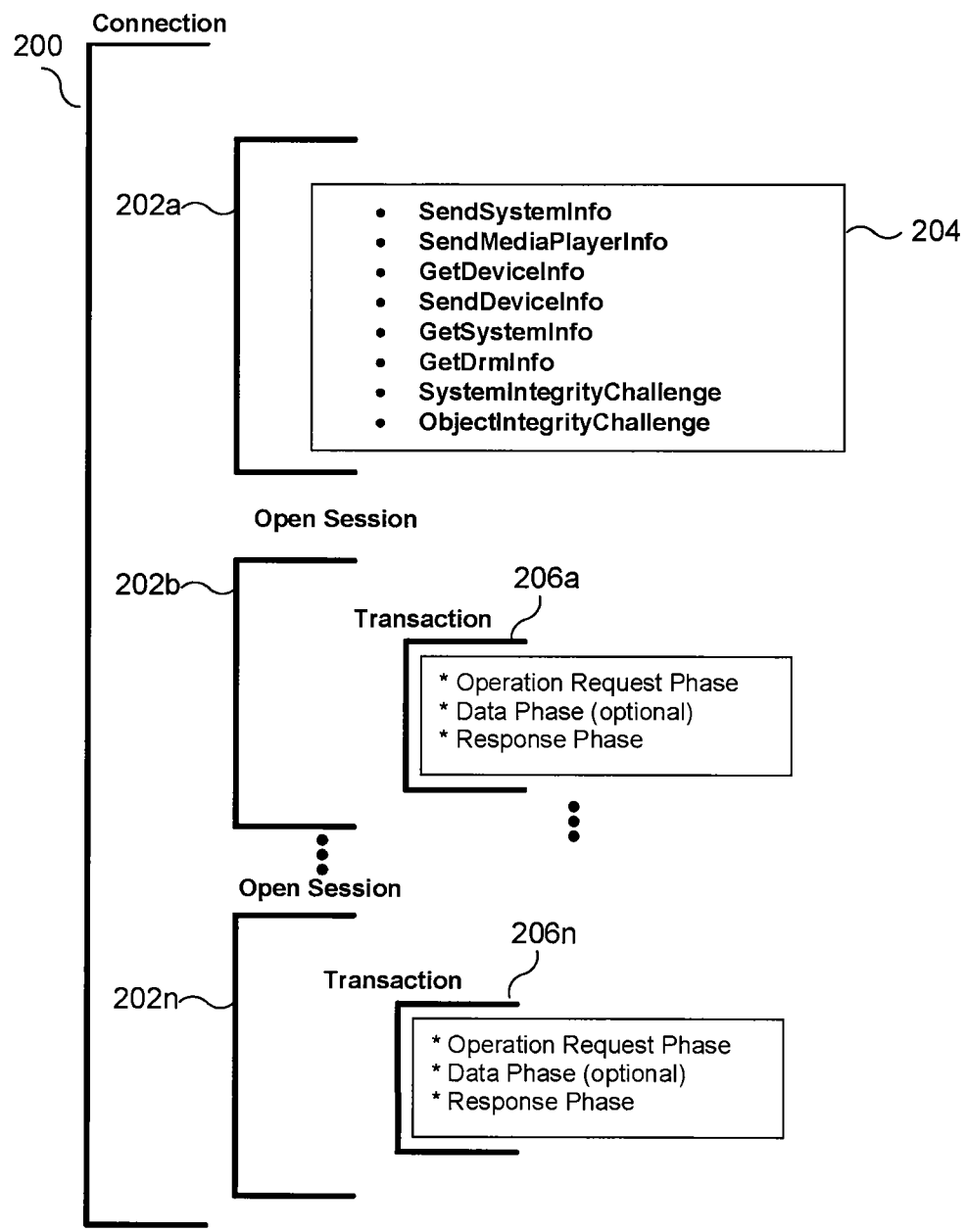
FIG. 2 illustrates an example connection according to an embodiment of the invention.

FIG. 2 illustrates an example connection 200 between initiator 102 and responder 104 according to an embodiment of the invention. Connection 200 between initiator 102 and responder 104 may be via a physical or a wireless medium including but not limited to Universal Serial Bus (USB), Wireless Fidelity (WiFi), Bluetooth, Transport Control Protocol/Internet Protocol (TCP/IP), Infrared Data Association (IrDA). During the life of connection 200, initiator 102 and responder 104 communicate by opening sessions 202 and conducting transactions 206 within open sessions 202. A "transaction" between initiator 102 and responder 104 comprises one or more of an operation, an event and a response. The response may be in the form of an operation or event.

In the duration of connection 200, device and system information 204 is exchanged in the first session 202*a* between initiator 102 and responder 104. After the exchange of device and system information 204 in first session 202*a*, further sessions 202*b*-202*n* can be conducted without re-exchanging device and system information 204. As a result the overhead of exchanging device and system information 204 at the start of each session 202 is eliminated thereby significantly reducing overhead and speeding up transactions 206 between initiator 102 and responder 104. Another advantage of the present embodiment is that exchanging device and system information 204 at the start of connection 200 allows responder 104 to learn limitations of initiator 102 and configure its internal programs (running on processor 106) accordingly. In an embodiment, responder 104 may disclose to initiator 102 certain predetermined operations, events and properties based on a version of an operating system or media player application running on processor 108 of initiator 102.

In an embodiment, subsequent to a disconnection that terminates connection 200, initiator 102 and responder 104 again exchange system and device information 204 at the start of a new connection (not shown). In this case, initiator 102 and responder 104 re-exchange information in the event that either initiator 102 or responder 104 has changed hardware configuration or software during the connection due to, for example, a system and/or software change/upgrade.

In an embodiment, system and device information includes but is not limited to one or more of transmission protocols supported, driver vendor number, driver vendor ID, operating system used, operating system revision number, operating system patch information, hardware information (manufacturer, make, model and capabilities), internationalization (such as country, language and time zone), media player name and media player version.

It is to be appreciated that the example connection 200 is optional and may not be needed to implement a generic DRM framework between an initiator and responder.

5. Drm Framework Components

5a. DRM Framework Overview

According to an embodiment of the invention, a generic DRM framework comprises an arbitrary number of DRM systems. The generic DRM framework described herein enables management of any arbitrary set of DRM systems. All components within the Generic DRM Framework are referred to as Objects. Objects have IDs and associated descriptive properties. The Generic DRM Framework includes several types of Objects including but not limited to Protected objects, License objects, Management objects and Composite objects as described below. Each DRM system is enabled to encrypt arbitrary media content into DRM Protected Objects to protect the content from unauthorized use, and correspondingly decrypt the DRM Protected Objects for rendering on a device.

DRM systems use DRM License Objects and DRM Management Objects to encrypt arbitrary media content into DRM Protected Objects, and decrypt from DRM Protected Objects onto media rendering devices such as audio players, video players, image or document display devices and manage the use of the DRM protected content.

A DRM system is governed by a set of privileges encoded in DRM License Objects and optionally additional rules encoded into DRM Management Objects. DRM Protected Objects, DRM License Objects, DRM Management Objects and the DRM system all are associated within the generic DRM framework.

A DRM system uses encryption and decryption algorithms using optimized hardware and software systems to implement cryptographic algorithms including but not limited to one or more of Advanced Encryption Standard (AES), Public Key Intrastructure (PKI), Elliptic Curve Cryptography (ECC), and Rivest Cipher 5 (RC5) algorithms.

In one embodiment, the DRM Protected Objects, DRM License Objects, DRM Management Objects can operate in a media transport protocol (MTP) environment, and the DRM projected objects, DRM license objects and DRM management objects can be transmitted between, for example, an initiator 102 and a responder 104.

5b. DRM System and Object Identification (ID) and Identification Space

Multiple DRM systems may co-exist on a device or multiple devices within a generic DRM Framework. In an embodiment, each DRM system has a unique DRM system identification (ID) number to provide for unique identification. For example, consider six DRM systems, with DRM system identifications 1-6. DRM systems 1, 2 and 5 may operate on processor 108, memory 112 and disk 116 of device 102 and DRM systems 3, 4, 6 may operate on processor 106, memory 110 and disk 114 of device 104. DRM system ID numbers may be represented as, for example, unsigned 32-bit integers. In another embodiment, the DRM system ID may be constructed as a character string.

All objects within the generic DRM framework share a global object ID numbering space by default. The object ID numbering space may be implemented as unsigned 32-bit integers, for example, so that each object has a unique unsigned 32-bit ID. Each DRM object (Protected, License, Management and Composite) has a unique object ID. The object ID is unique within the scope of the space in which it defined. Each DRM system may share the global object ID space.

Multiple object ID spaces may exist within a given DRM system. For example, in a given DRM system a DRM protected object ID may exist in one ID space and the DRM License Object ID may exist in another space. This allows a DRM system to refer to license objects within a license object space, and protected objects within a separate and distinct generic object space.

In another embodiment, for a given DRM system, all DRM component object ID's may exist within a single global space with each Object ID being unique within the global ID space.

The rules for object ID spaces are undefined within the generic DRM Framework but may be specific to each DRM system.

5c. DRM Protected Objects

A DRM Protected Object may contain arbitrary content including but not limited to audio, video and data files, and is encrypted using an arbitrary encryption method to protect the content. The corresponding decryption system may be required to render the media on a media device. It is to be appreciated that the method and algorithm used to encrypt and decrypt the contents of an object may an arbitrary design choice.

5d. DRM License Objects

A DRM license object contains information to enable a DRM system to manage corresponding DRM protected objects by associating one or more DRM license objects with corresponding DRM protected objects. The DRM license objects may be encrypted. DRM license objects may contain rights information including but not limited to expiration dates, rendering count limits, allowed rendering devices and associated device identification information, rendering device restrictions and copy restrictions.

5d. DRM Management Objects

A DRM management object may contain additional information or rules associated with DRM protected objects and DRM license objects that enable features of a DRM system. DRM management objects may be encrypted. DRM management objects may contain information about a DRM authority, rules for evaluating a DRM license object on a given device or class of devices, associations between multiple DRM license objects or groups of DRM license objects and/or DRM objects.

5e. DRM Composite Objects

A DRM composite object may contain several DRM components in a single object. For example, a DRM composite object may contain both a DRM protected object, the corresponding DRM license object and/or even a DRM management object combined. DRM composite objects may also contain multiple arbitrary objects of different data types.

5f. DRM License Object Secure Storage

DRM License Objects transmitted via a protocol such as MTP are placed in a specific, secure storage location on a responder 104 or initiator 102 to protect the DRM license information from remote access, and also prevent the DRM licenses from being exposed to a host computer via remote file system interfaces. For example, in MTP a Storage ID may be used by the protocol for identifying the secured storage location. The DRM Framework does not allow for DRM component transmission without prior authentication between initiator 102 and responder 104 to establish trust.

5g. DRM Component Transmission

According to an embodiment, DRM license objects and DRM management objects are transmitted prior to their corresponding DRM protected objects to prevent situations where DRM protected objects could be orphaned and therefore unplayable due to lack of corresponding licenses. In an embodiment, by combining DRM components into DRM composite objects unplayable content problems due to orphaned DRM objects are avoided.

6. DRM Management in Generic DRM Framework

The operations, datasets and properties described below are used to manage DRM activity for multiple DRM systems within a generic DRM framework.

6a. DRM Capability Operation

Figure 3A:
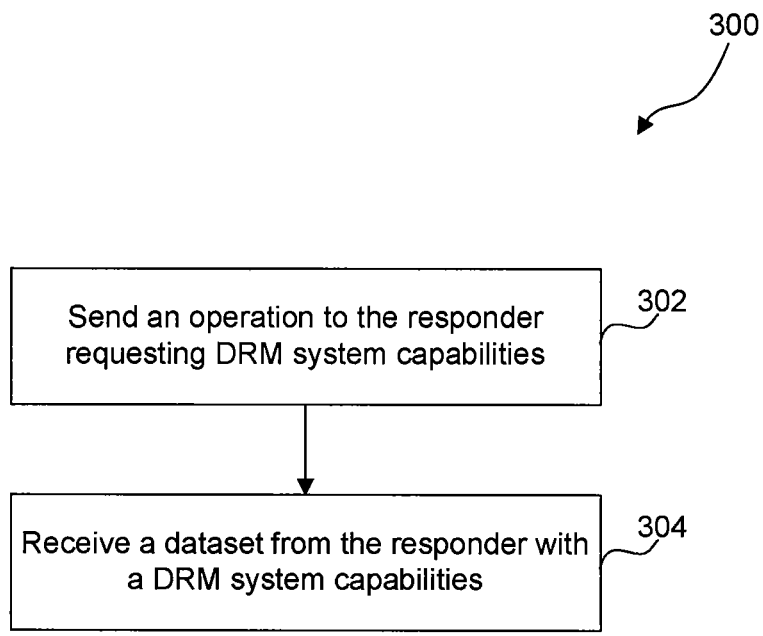
FIG. 3A illustrates an example flow chart illustrating steps performed to exchange data on capabilities of a DRM system according to an embodiment of the invention.

FIG. 3A illustrates an example flow chart 300 illustrating steps performed to exchange data on capabilities of a Digital Rights Management (DRM) system, between an initiator and a responder operating under a data transfer protocol according to an embodiment of the invention. Flowchart 300 will be described with continued reference to the example operating environment depicted in FIG. 1. However, the flowchart is not limited to that embodiment. Note that some steps shown in flowchart 300 do not necessarily have to occur in the order shown.

In step 302, an initiator sends an operation to a responder to prompt the responder to send capabilities of its DRM system back to the initiator. For example, initiator 102 sends a DRM capabilities operation to responder 104. Table 1 below shows an example operation sent from initiator 102 to responder 104 to prompt responder 104 to send data on its DRM capabilities back to initiator 102. It is to be appreciated that the length and type of operation code in the tables below are an arbitrary design choice.

TABLE 1

| | |
|---|---|
| Operation Code | 0x9801 |
| Operation Parameter 1 | DRM System ID |
| Operation Parameter 2 | Vendor-specific DRM Capability ID |
| Operation Parameter 3 | None |
| Operation Parameter 4 | None |
| Operation Parameter 5 | None |
| Data | DrmCapability dataset |
| Data Direction | R->I |
| ResponseCode Options | OK, Operation_Not_Supported, Session_Not_Open, Device_Busy, Invalid_System_ID, Invalid_Capability_ID |
| Response Parameter 1 | None |
| Response Parameter 2 | None |
| Response Parameter 3 | None |
| Response Parameter 4 | None |
| Response Parameter 5 | None |

In an embodiment, initiator 102 may include optional parameters such as DRM system identification that uniquely identifies the DRM system and vendor specific DRM capability identification which uniquely identifies a vendor of the DRM system.

In step 304, in response to the operation received in step 302, the responder sends a dataset with its DRM capabilities to the initiator. For example, responder 104 sends the dataset illustrated in table 2 below to initiator 102. In an alternate embodiment, responder 104 sends the dataset in table 2 to initiator 102 even if the dataset is not solicited by initiator 102. The dataset in table 2 is used to describe a specific DRM system on responder 104. Multiple DRM systems may be deployed on a responder 104 and each may be described by a corresponding DRM capabilities dataset. Each DRM system on responder 104 has an associated unique DRM system identification.

TABLE 2

| Dataset field | Field order | Length (bytes) | Datatype |
|---|---|---|---|
| DRM System ID | 5 | 4 | UINT32 (Vendor specific) |
| DRM capability Vendor | 1 | Variable | String |
| DRM capability Version | 2 | Variable | String |
| DRM capability features | 3 | Variable | String |
| DRM Capability Permissions | 4 | Variable | String |

TABLE 2-continued

| Dataset field | Field order | Length (bytes) | Datatype |
|---|---|---|---|
| DRM capability status | 6 | 2 | UINT16 (Vendor Specific) 1 = ON 2 = OFF 3 = Expired |

The DRM System ID field indicates a vendor-specific DRM system identification.

The DRM capability vendor indicates the vendor of the DRM system.

The DRM capability version indicates a version number of the DRM system.

The DRM capability features indicates whether the DRM system is enabled to play video and the resolution, (example resolutions including but not limited to Standard Definition (SD), High Definition (HD), 1080p and 1080i); to play audio (example formats including but not limited to WAV and MP3); to display e-books (example formats including but not limited to WORD, ASCII and PDF); to display images (example formats including but not limited to JPEG and GIF); and whether the DRM system is enabled to display or render other media content such as slides.

The DRM capability permissions indicates whether the DRM system is allowed to render video, audio, e-books, images and other media content such as slides.

The DRM capability status indicates whether the DRM system has a secure path for rendering media content such as video, audio, image or data. The type of media that the DRM system is allowed to render is indicated by the DRM capability features field. A value of 1 indicates that the path is secure whereas 0 indicates that the path is not secure. A value of 3 indicates a DRM license associated with the media content has expired and the media cannot be rendered.

It is to be appreciated that the dataset fields are a design choice and may be arbitrary. In an embodiment, the dataset fields are specified by a vendor of responder 104.

Figure 3B:
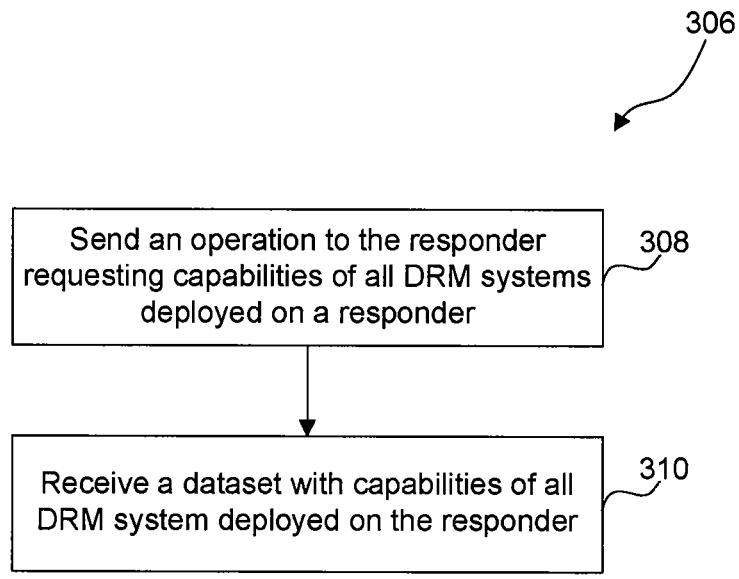
FIG. 3B illustrates an example flow chart illustrating steps performed to exchange capabilities of multiple DRM systems according to an embodiment of the invention.

FIG. 3B illustrates an example flow chart 306 illustrating steps performed to exchange a list of DRM capability datasets, between an initiator and a responder operating under a data transfer protocol according to an embodiment of the invention. Flowchart 306 will be described with continued reference to the example operating environment depicted in FIG. 1. However, the flowchart is not limited to that embodiment. Note that some steps shown in flowchart 306 do not necessarily have to occur in the order shown.

In step 308, an initiator sends an operation to a responder to prompt the responder to send a list of DRM capability datasets to the initiator. The dataset requested has a list that describes each of multiple DRM systems which may be deployed on the responder. The list comprises multiple DRM capability datasets as shown above in table 2. For example, initiator 102 sends a DRM list operation to responder 104. Table 3 below shows an example operation sent from initiator 102 to responder 104 to prompt responder 104 to send a list of DRM capability datasets back to initiator 102.

TABLE 3

| Operation Code | 0x9802 |
|---|---|
| Operation Parameter 1 | DRM System ID |
| Operation Parameter 2 | None |
| Operation Parameter 3 | None |

TABLE 3-continued

| Operation Parameter 4 | None |
|---|---|
| Operation Parameter 5 | None |
| Data | DrmCapabilityList dataset |
| Data Direction | R->I |
| ResponseCode Options | OK, Operation_Not_Supported, Session_Not_Open, Device_Busy, Invalid_System_ID |
| Response Parameter 1 | None |
| Response Parameter 2 | None |
| Response Parameter 3 | None |
| Response Parameter 4 | None |
| Response Parameter 5 | None |

In an embodiment, initiator 102 may include an optional parameter such as DRM system identification information that uniquely identifies the DRM system.

In step 310, in response to the operation received in step 308, the responder sends to the initiator a dataset with a list of DRM capability datasets corresponding to DRM systems deployed on it. For example, responder 104 sends the dataset illustrated in table 4 below to initiator 102. In an alternate embodiment, responder 104 sends the dataset in table 4 to initiator 102 even if the dataset is not solicited by initiator 102. Multiple DRM systems may be deployed on a responder 104 and each may be described by a corresponding DRM capability dataset. The dataset in table 4 is a list that describes each of multiple DRM systems which may be deployed on responder 104. Each DRM system on responder 104 has an associated unique DRM system identification.

TABLE 4

| Dataset field | Field order | Length (bytes) | Datatype |
|---|---|---|---|
| DrmCapability Dataset 1 | 1 | DTS | Dataset |
| ... | | | |
| DrmCapability Dataset n | n | DTS | Dataset |

It is to be appreciated that the dataset fields are a design choice and may be arbitrary. In an embodiment, the dataset fields are specified by a vendor, manufacturer or designer of responder 104.

6b. DRM Partner Features

DRM partners are devices which operate under the management of a common DRM management entity. The common DRM management entity supports DRM content sharing between devices. All DRM partners share a common DRM authority which registers, authenticates, and manages each DRM partners' capability to share DRM protected content.

Figure 4:
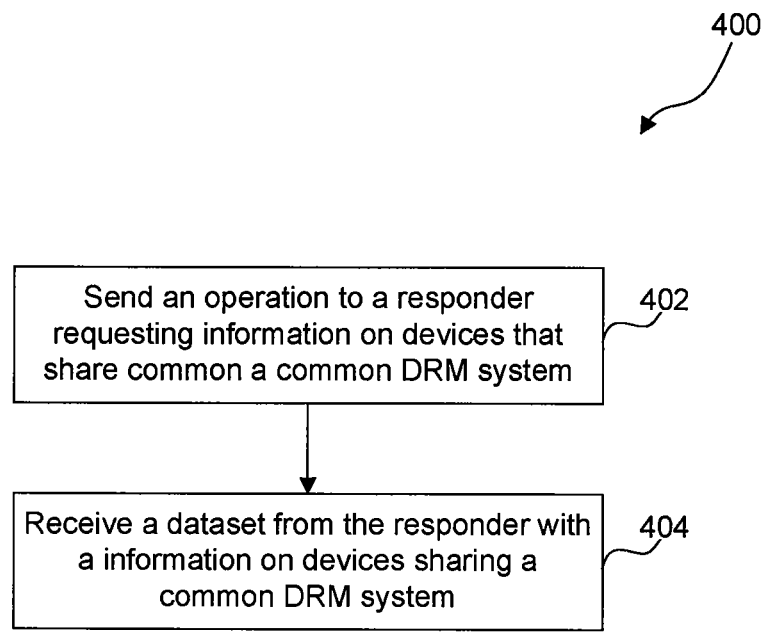
FIG. 4 illustrates an example flow chart illustrating steps performed to exchange data on devices which operate under the management of a common DRM management entity according to an embodiment of the invention.

FIG. 4 illustrates an example flow chart 400 illustrating steps performed to exchange data on devices which operate under the management of a common DRM management entity, between an initiator and a responder operating under a data transfer protocol according to an embodiment of the invention. Flowchart 400 will be described with continued reference to the example operating environment depicted in FIG. 1. However, the flowchart is not limited to that embodiment. Note that some steps shown in flowchart 400 do not necessarily have to occur in the order shown.

In step 402, an initiator sends an operation to a responder to prompt the responder to send a list of devices which operate under the management of a common DRM management entity. For example, initiator 102 sends a DRM partners operation to responder 104. In an example, the responder 104 may be a part of a home or office network including but not limited to computers, portable media players, portable phones and television sets. Table 5 below shows an example operation sent from initiator 102 to responder 104 to prompt responder 104 to send data on devices which operate under the management of a common DRM management entity.

TABLE 5

| | |
|---|---|
| Operation Code | 0x9803 |
| Operation Parameter 1 | None |
| Operation Parameter 2 | None |
| Operation Parameter 3 | None |
| Operation Parameter 4 | None |
| Operation Parameter 5 | None |
| Data | DRM Partner dataset |
| Data Direction | R->I |
| ResponseCode Options | OK, Operation_Not_Supported, Session_Not_Open, Device_Busy, Invalid_System_ID |
| Response Parameter 1 | None |
| Response Parameter 2 | None |
| Response Parameter 3 | None |
| Response Parameter 4 | None |
| Response Parameter 5 | None |

In step 404, in response to the operation received in step 402, the responder sends a dataset with data on devices which operate under the management of a common DRM management entity. For example, responder 104 sends the dataset illustrated in table 6 below to initiator 102. In an alternate embodiment, responder 104 sends the dataset in table 6 to initiator 102 even if the dataset is not solicited by initiator 102.

TABLE 6

DRM Partner dataset.

| Dataset field | Field order | Length (bytes) | Datatype |
|---|---|---|---|
| Partner link type | 1 | 2 | UINT16 |
| Partner link address | 2 | Variable | String |
| Partner alias/name | 3 | Variable | String |
| Partner device type | 4 | 2 | UINT16 |
| Partner sharing rights | 2 | Variable | AUINT8 Vendor specific string |

In an embodiment, partner link type field indicates communication protocol in use, for example, Internet Protocol (IP), Universal Resource Locator (URL), Ethernet, device name alias, Universal Serial Bus (USB) or Bluetooth.

In an embodiment, partner link address field indicates the address, for example, IP address, URL, Ethernet address, USB address or device name alias.

In an embodiment, partner alias name indicates a name for the partner device in a string format.

In an embodiment, partner device type field indicates a type of device for example, television (TV), portable device, web server, computer, switch, cable company head-end or satellite.

In an embodiment, partner sharing rights field indicates a vendor specific description of the restrictions on DRM content sharing.

6c. DRM Authority Features

Figure 5:
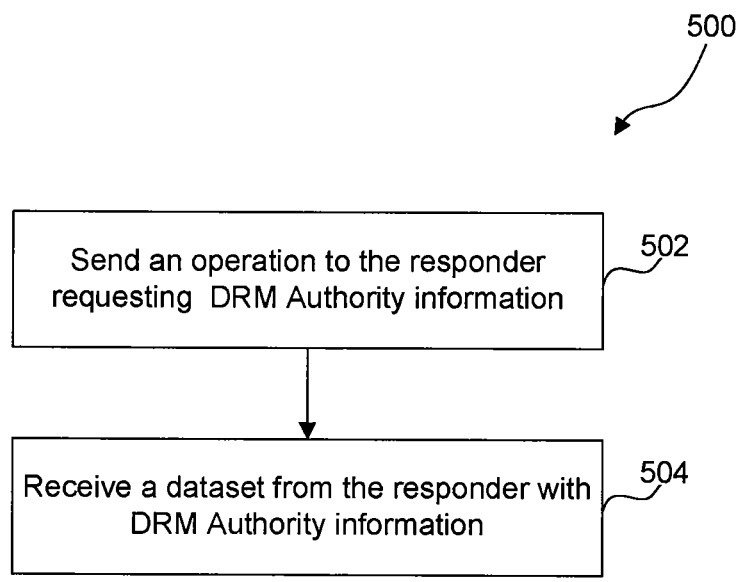
FIG. 5 illustrates an example flow chart illustrating steps performed to exchange data on a DRM authority according to an embodiment of the invention.

FIG. 5 illustrates an example flow chart 500 illustrating steps performed to exchange data on a DRM authority, between an initiator and a responder operating under a data transfer protocol according to an embodiment of the invention. Flowchart 500 will be described with continued reference to the example operating environment depicted in FIG. 1. However, the flowchart is not limited to that embodiment. Note that some steps shown in flowchart 500 do not necessarily have to occur in the order shown.

In step 502, an initiator sends an operation to a responder to prompt the responder to send information on a DRM Authority. For example, initiator 102 sends a DRM authority operation to responder 104. Table 5 below shows an example operation sent from initiator 102 to responder 104 to prompt responder 104 to send data on a DRM Authority by providing a DRM system identification in operation parameter 1 field below.

TABLE 7

| | |
|---|---|
| Operation Code | 0x9804 |
| Operation Parameter 1 | DRM System ID |
| Operation Parameter 2 | None |
| Operation Parameter 3 | None |
| Operation Parameter 4 | None |
| Operation Parameter 5 | None |
| Data | DrmAuthority dataset |
| Data Direction | R->I |
| ResponseCode Options | OK, Operation_Not_Supported, Session_Not_Open, Device_Busy, Invalid_System_ID |
| Response Parameter 1 | None |
| Response Parameter 2 | None |
| Response Parameter 3 | None |
| Response Parameter 4 | None |
| Response Parameter 5 | None |

In step 504, in response to the operation received in step 502, the responder sends a dataset with DRM Authority information. For example, responder 104 sends the dataset illustrated in table 8 below to initiator 102. In an alternate embodiment, responder 104 sends the dataset in table 8 to initiator 102 even if the dataset is not solicited by initiator 102.

TABLE 8

DRM Authority dataset.

| Dataset field | Field order | Length (bytes) | Datatype |
|---|---|---|---|
| Authority link type | 1 | 2 | UINT16 |
| Authority link address | 2 | Variable | String |
| Authority alias/name | 3 | Variable | String |
| Authority device type | 4 | 2 | UINT16 |
| Authority rights granted | 2 | Variable | AUINT8 Vendor specific string |

In an embodiment, authority link type field indicates a communication protocol in use, for example, Internet Protocol (IP), Universal Resource Locator (URL), Ethernet, device name alias, Universal Serial Bus (USB) or Bluetooth.

In an embodiment, authority link address field indicates an address, for example, IP address, URL, Ethernet address, USB address or device name alias.

In an embodiment, authority alias name indicates a name for the authority device in a string format.

In an embodiment, authority device type indicates the type of device for example, a television (TV), portable device, web server, computer, switch, cable company head-end or satellite.

In an embodiment, authority sharing rights indicates a vendor specific description of the restrictions on DRM content sharing.

6d. DRM Trust Information

Figure 6:
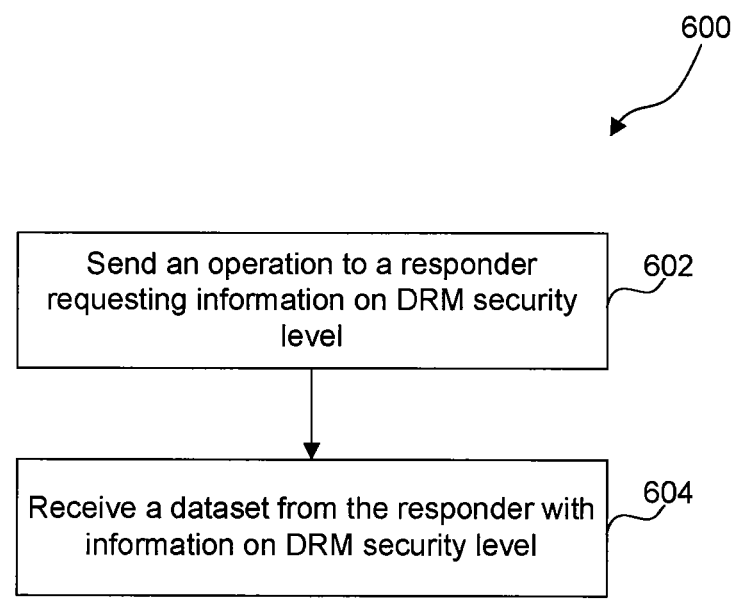
FIG. 6 illustrates an example flow chart illustrating steps performed to exchange data on DRM security level information.

FIG. 6 illustrates an example flow chart 600 illustrating steps performed to exchange data on DRM security level information, between an initiator and a responder operating under a data transfer protocol according to an embodiment of the invention. Flowchart 600 will be described with continued reference to the example operating environment depicted in FIG. 1. However, the flowchart is not limited to that embodiment. Note that some steps shown in flowchart 600 do not necessarily have to occur in the order shown.

In step 602, an initiator sends an operation to a responder to prompt the responder to send DRM security level information. For example, initiator 102 sends a DRM trust data operation to responder 104. Table 9 below shows an example operation sent from initiator 102 to responder 104 to prompt responder 104 to send DRM security level information.

TABLE 9

| | |
|---|---|
| Operation Code | 0x9805 |
| Operation Parameter 1 | None |
| Operation Parameter 2 | None |
| Operation Parameter 3 | None |
| Operation Parameter 4 | None |
| Operation Parameter 5 | None |
| Data | DRM Trust dataset |
| Data Direction | R->I |
| ResponseCode Options | OK, Operation_Not_Supported, Session_Not_Open, Invalid_TransactionID, Parameter_Not_Supported, Invalid_Parameter, Capture_Already_Terminated |
| Response Parameter 1 | None |
| Response Parameter 2 | None |
| Response Parameter 3 | None |
| Response Parameter 4 | None |
| Response Parameter 5 | None |

In step 604, in response to the operation received in step 602, the responder sends a dataset with DRM security level information for a DRM system implemented on the responder. For example, responder 104 sends the dataset illustrated in table 10 below to initiator 102. In an alternate embodiment, responder 104 sends the dataset in table 10 to initiator 102 even if the dataset is not solicited by initiator 102.

TABLE 10

DRM Trust dataset.

| Dataset field | Field order | Size (bytes) | Datatype |
|---|---|---|---|
| Secure Boot | 1 | 2 | UINT16 |
| Trusted clock | 2 | 2 | UINT16 |
| DeviceClass | 3 | 2 | UINT32 |
| Crypto HW capabilities | 4 | Variable | String |
| Secure components | 5 | Variable | String |
| OrangeBookLevel | 6 | Variable | String |
| DevicePublicKey | 7 | Variable | String |
| TrustAuthorityAddresses | 9 | Variable | String |
| DeviceAddresses | 10 | Variable | String |

Secure Boot field indicates whether the responder supports a trusted boot capability used to verify if a trusted boot image is executed. In an embodiment, a value of 0x00 indicates that Secure Boot is not supported and a value of 0x01 indicates that Secure Boot supported.

Trusted Clock information field indicates whether the responder supports a trusted clock which cannot be tampered with or reset by a user. In an embodiment, a value of 0x00 indicates that no trusted clock is supported and a value of 0x01 indicates that a trusted clock is supported. Crypto hardware capabilities field indicates whether the responder supports cryptographic algorithms and features which are accelerated in hardware. Cryptographic algorithms include but are not limited to Advanced Encryption Standard (AES), Data Encryption Standard (DES), Secure Hash Algorithm 1 (SHA 1), Secure Hash Algorithm 2 (SHA 2), Message Digest 4 (MD4), Message Digest 5 (MD5), Rivest Cipher 4 (RC4) and Rivest Cipher 5 (RC5). In an embodiment, hardware accelerated cryptographic algorithms and features are indicated by a comma-separated case insensitive string for example, "AES, DES, RC5, SHA1, SHA2, MD4, MD5, RANDOM_NUMBER_GENERATOR."

Secure components field indicates whether the responder provides secure components including but not limited to a secure audio rendering path, secure display system and a secure keyboard. Secure components are indicated in a comma-separated string of the following format, for example, "Audio, Video, Display, Keyboard, Storage, Curtained Memory."

Orange book level information field is a string containing the Orange Book security level supported by the responder. Example orange book levels as defined by the US Department of Defense Trusted Computer System Evaluation Criteria, also known as the "Orange Book" include levels D, C, C1, C2, B, B1, B2, B3, A, A1, A2 and Ax.

Device public key field is a string comprising a public key of the responder. The field may contain an entry, for example "-----BEGIN PUBLIC KEY-----
MHwwDQYJKoZIhvcNAQEBBQADawAwaAJhAKJ2lzDLZ8XlVambQfM
Xn3LRGKOD5o6l
MIgulclWjZwP56LRqdg5ZX15bhc/GsvW8xW/R5Sh1NnkJNyL/cqY1a+Gzz
L47t7E
    XzVc+nRLWT1kwTvFNGIoAUsFUq+J6+OprwIDAQAB
-----END PUBLIC KEY-----"

Device class field has a bit flag indicating the class of the responder. The responder may be multi function and may implement multiple classes. For example, the following codes may be used:

0x00000001=TV
0x00000002=VCR
0x00000004=DVD
0x00000008=Blu-Ray player
0x00000010=HD_DVD player
0x00000020=Portable media device
0x00000040=Cell phone
0x00000080=Portable computing device
0x00001100=PC computer
0x00000200=Web server
0x00000400=Telco switch
0x00000800=Cable company head-end
0x00001000=Satellite
0x00002000=Medical device
0x00004000=GPS device A multi-function device code may be defined as:
0x00000060=Cell phone+Portable Media Player Trust Authority Addresses field has a string comprising multiple addresses for the authority of the responder. Address types include but are not limited to one or more of IP, IPV6, HTTP, MAC, telephone number and SMTP. An example value in the field may be: "IP=123.23.445.32, SMTP=admin@domain.com, IPV6=2001:0db8:0000:0000: 0000:0000:1428:57ab."

Device Addresses field has a string comprising multiple addresses which are supported for the responder. Addresses include but are not limited to: IP, IPV6, HTTP, MAC, telephone number and SMTP. An example value in the field is: "IP=123.23.445.32, SMTP=admin@domain.com, IPV6=2001:0db8:0000:0000:0000:0000:1428:57ab."

6e. Common Criteria Evaluation and Validation Scheme (CCEVS) Protection

Figure 7A:
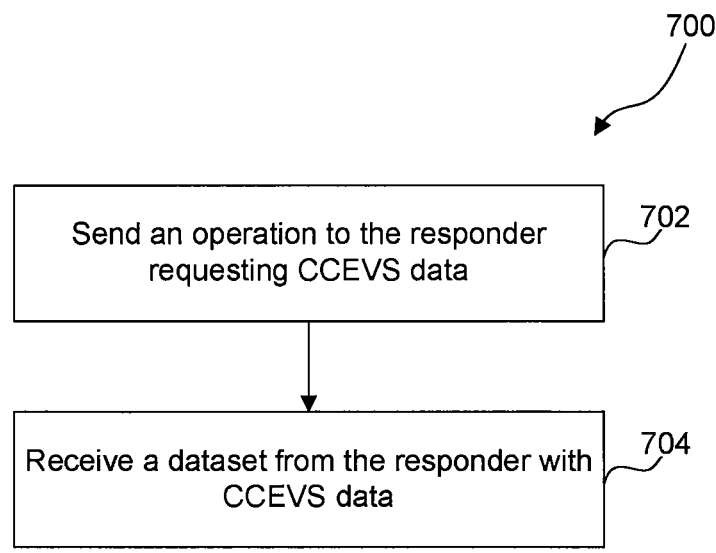
FIG. 7A illustrates an example flow chart illustrating steps performed to exchange Common Criteria Evaluation and Validation Scheme (CCEVS) protection profile information.

FIG. 7A illustrates an example flow chart 700 illustrating steps performed to exchange CCEVS protection profile information, between an initiator and a responder operating under a data transfer protocol according to an embodiment of the invention. Flowchart 700 will be described with continued reference to the example operating environment depicted in FIG. 1. However, the flowchart is not limited to that embodiment. Note that some steps shown in flowchart 700 do not necessarily have to occur in the order shown.

In step 702, an initiator sends an operation to a responder to prompt the responder to send data on a CCEVS protection profile back to the initiator. For example, initiator 102 sends a CCEVS protection profile operation to responder 104. Table 11 below shows an example operation sent from initiator 102 to responder 104 to prompt responder 104 to send data on its CCEVS protection profile back to initiator 102.

TABLE 11

| | |
|---|---|
| Operation Code | 0x9806 |
| Operation Parameter 1 | None |
| Operation Parameter 2 | None |
| Operation Parameter 3 | None |
| Operation Parameter 4 | None |
| Operation Parameter 5 | None |
| Data | CCEVS Protection Profile dataset |
| Data Direction | R -> I |
| ResponseCode Options | OK, Operation_Not_Supported, Session_Not_Open, Invalid_TransactionID, Parameter_Not_Supported, Invalid_Parameter, Capture_Already_Terminated |
| Response Parameter 1 | None |
| Response Parameter 2 | None |
| Response Parameter 3 | None |
| Response Parameter 4 | None |
| Response Parameter 5 | None |

In step 704, in response to the operation received in step 702, the responder sends a dataset with its CCEVS protection profile to the initiator. For example, responder 104 sends the dataset illustrated in table 12 below to initiator 102. In an alternate embodiment, responder 104 sends the dataset in table 12 to initiator 102 even if the dataset is not solicited by initiator 102. The dataset in table 2 is used to describe a specific DRM system on responder 104. Multiple CCEVS systems may be deployed on responder 104 and each may be described by a corresponding CCEVS protection profile dataset. Each DRM system on responder 104 may also have an associated unique CCEVS identification.

TABLE 12

CCEVS Protection Profile dataset.

| Dataset field | Field order | Size (bytes) | Datatype |
|---|---|---|---|
| Technology Type | 5 | Variable | String |
| Profile Name | 6 | Variable | String |
| Conformance Claim | 8 | Variable | String |
| Protection Profile Version | 8 | Variable | String |
| Abbreviation Sponsor | 4 | Variable | String |
| Sunset date | 4 | Variable | String |

The technology type field indicates a type of technology supported. For example, the type of technology includes but is not limited to one or more of Anti-virus, biometrics, intrusion detection service, firewall, web server and wireless local area network.

The profile name field indicates a name for the protection profile which may be provided by a vendor.

The conformance claim field indicates a level of protection provided. For example, the conformance claim field may indicate the level of protection as basic or medium robustness.

The Protection Profile version field indicates a version of the protection profile in use.

The sunset date field may indicate a date on which the protection profile dataset will not be valid.

It is to be appreciated that the dataset fields are a design choice and may be arbitrary. In an embodiment, the dataset fields are specified by a vendor, manufacturer or designer of responder 104.

Figure 7B:
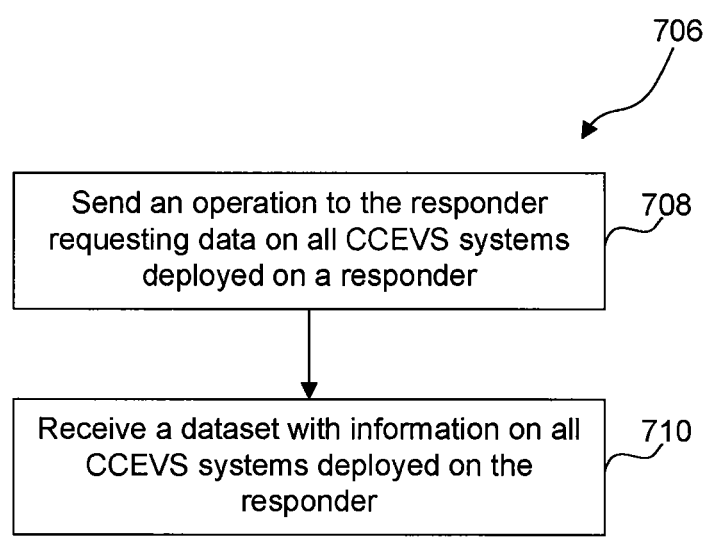
FIG. 7B illustrates an example flow chart illustrating steps performed to exchange multiple CCEVS protection profile datasets.

FIG. 7B illustrates an example flow chart 706 illustrating steps performed to exchange a list of CCEVS protection profile datasets, between an initiator and a responder operating under a data transfer protocol according to an embodiment of the invention. Flowchart 706 will be described with continued reference to the example operating environment depicted in FIG. 1. However, the flowchart is not limited to that embodiment. Note that some steps shown in flowchart 706 do not necessarily have to occur in the order shown.

In step 708, an initiator sends an operation to a responder to prompt the responder to send a list of CCEVS protection profile datasets to the initiator. The dataset requested has a list that describes each of multiple CCEVS systems which may be deployed on the responder. The list comprises CCEVS protection profile datasets as shown above in table 12. For example, initiator 102 sends a CCEVS protection profile list operation to responder 104. Table 13 below shows an example operation sent from initiator 102 to responder 104 to prompt responder 104 to send a list of CCEVS protection profile datasets back to initiator 102.

TABLE 13

| | |
|---|---|
| Operation Code | 0xXXXX |
| Operation Parameter 1 | None |
| Operation Parameter 2 | None |
| Operation Parameter 3 | None |
| Operation Parameter 4 | None |
| Operation Parameter 5 | None |
| Data | CCEVSProtectionProfileList dataset |
| Data Direction | R -> I |
| ResponseCode Options | OK, Operation_Not_Supported, Session_Not_Open, Invalid_TransactionID, Parameter_Not_Supported, Invalid_Parameter, Capture_Already_Terminated |
| Response Parameter 1 | None |
| Response Parameter 2 | None |
| Response Parameter 3 | None |

TABLE 13-continued

Response Parameter 4    None
Response Parameter 5    None

In step 710, in response to the operation received in step 708, the responder sends a dataset with a list of CCEVS protection profile datasets deployed on it to the initiator. For example, responder 104 sends the dataset illustrated in table 14 below to initiator 102. In an alternate embodiment, responder 104 sends the dataset in table 14 to initiator 102 even if the dataset is not solicited by initiator 102. The dataset in table 14 is a list that describes each of multiple CCEVS systems which may be deployed on responder 104. Multiple CCEVS systems may be deployed on a responder 104 and each may be described by a corresponding CCEVS protection profile dataset as shown in table 12. Each DRM system on responder 104 has an associated unique DRM system identification.

TABLE 14

CCVESProtectionProfileList dataset.

| Dataset field | Field order | Size (bytes) | Datatype |
|---|---|---|---|
| CCEVSProtectionProfile1 | 1 | DTS | CCEVSProtectionProfile dataset |
| ... | ... | ... | ... |
| CCEVSProtectionProfile1 | 1 | DTS | CCEVSProtectionProfile dataset |

It is to be appreciated that the dataset fields are a design choice and may be arbitrary. In an embodiment, the dataset fields are specified by a vendor of responder 104.

7. Generic DRM Properties

These properties are used to mark DRM Protected Objects, DRM License Objects, DRM Composite Objects and DRM Management Objects. In each of the property tables below:

The property code uniquely identifies the property in the table. It will be appreciated by persons of ordinary skill in the art that the property code may be arbitrary.

The datatype field indicates a format of the data in the value/default value section. The format may be, for example, unsigned integer, string or a hexadecimal code.

The get/set field indicates whether the property is read only, write only or can be both read from and written to.

The value field is the data of the property. A vendor typically includes a default value for a property.

The group code indicates a group of properties that the current property is a part of.

The form flag field indicates a form of the datatype field e.g. an enumerated form.

7a. DRM License Type Property

In an embodiment, the property in table 15 below may be used to mark any object such as a DRM Protected Object to indicate the DRM protection scheme associated with the Object. This property may be used with DRM Protected Objects, DRM License Objects, DRM Composite Objects and DRM Management Objects. DRM license may be one or more of Microsoft JANUS, Microsoft JUPITER, Open Mobile Alliance (OMA), MARLIN, FAIRPLAY, Open-Source License and/or Public Key Infrastructure (PKI).

TABLE 15

| Field name | Field order | Size (bytes) | Datatype | Value |
|---|---|---|---|---|
| PropertyCode | 1 | 2 | UINT16 | 0xDC86 |
| Datatype | 2 | 2 | UINT16 | 0x4002 (AUINT8) |
| Get/Set | 3 | 1 | UINT8 | Device-Defined |
| Value/DefaultValue | 4 | | | 0x00000000 (Empty Array) |
| GroupCode | 5 | 4 | UINT32 | Device-defined |
| FormFlag | 6 | 1 | UINT8 | 0x06 ByteArray form |

7b. DRM Management Object Property

In an embodiment, the property in table 16 below may be used to mark an object as being a DRM Management Object associated with individual DRM Objects or lists of DRM Protected Objects and DRM License Objects. DRM Management Objects may contain DRM related information including but not limited to rules, permissions, conditions, fee information, metering information, surcharge information, tax computation information, levy computation information, royalty computation information, UPC codes, copyright information, jurisdictional information, DRM authority information, DRM authority address information and devices or groups of devices associated with a DRM license.

TABLE 16

| Field name | Field order | Size (bytes) | Datatype | Value |
|---|---|---|---|---|
| PropertyCode | 1 | 2 | UINT16 | 0xDC86 |
| Datatype | 2 | 2 | UINT16 | 0x4002 (AUINT8) |
| Get/Set | 3 | 1 | UINT8 | Device-Defined |
| DefaultValue | 4 | | | 0x00000000 (Empty Array) |
| GroupCode | 5 | 4 | UINT32 | Device-defined |
| FormFlag | 6 | 1 | UINT8 | 0x06 ByteArray form |

7c. Drm License Object Corresponding ObjectID Property

In an embodiment, the property in table 17 below is used for License Objects and contains the ObjectID of the Protected Object associated with a particular License Object. A License Object may have multiple occurrences of this property corresponding to multiple Protected Objects.

TABLE 17

| Field name | Field order | Size (bytes) | Datatype | Value |
|---|---|---|---|---|
| Property Code | 1 | 2 | UINT16 | 0xDC87 |
| Datatype | 2 | 2 | UINT16 | 0x0004 (UINT32) |
| Get/Set | 3 | 1 | UINT8 | 0x01 (GET/SET) |
| DefaultValue | 4 | | | 0x00000000 |
| GroupCode | 5 | 4 | UINT32 | Device-defined |
| FormFlag | 6 | 1 | UINT8 | 0x00 None |

7d. DRM Protected Object Corresponding LicenceID Property

In an embodiment, the property in table 18 below is used for protected objects. The property comprises the License ID of a license object associated with an object. A Protected Object may have multiple occurrences of this property corresponding to each of multiple License Objects associated with the property. Accordingly, a user would need to have a corresponding license and license ID in order to use the protected data object.

TABLE 18

| Field name | Field order | Size (bytes) | Datatype | Value |
|---|---|---|---|---|
| PropertyCode | 1 | 2 | UINT16 | 0xDC88 |
| Datatype | 2 | 2 | UINT16 | 0x0004 (UINT32) |
| Get/Set | 3 | 1 | UINT8 | 0x01 (GET/SET) |
| DefaultValue | 4 | | | 0x00000000 |
| GroupCode | 5 | 4 | UINT32 | Device-defined |
| FormFlag | 6 | 1 | UINT8 | 0x00 None |

7e. DRM Protected Object Corresponding ManagerID Property

In an embodiment, the property in table 19 below is used for DRM License Objects. The property comprises a DRM Management Object ID associated with a DRM license.

TABLE 19

| Field name | Field order | Size (bytes) | Datatype | Value |
|---|---|---|---|---|
| PropertyCode | 1 | 2 | UINT16 | 0xDC89 |
| Datatype | 2 | 2 | UINT16 | 0x0004 (UINT32) |
| Get/Set | 3 | 1 | UINT8 | 0x01 (GET/SET) |
| DefaultValue | 4 | | | 0x00000000 |
| GroupCode | 5 | 4 | UINT32 | Device-defined |
| FormFlag | 6 | 1 | UINT8 | 0x00 None |

7f. DRM Corresponding CompositeID Property

In an embodiment, the property in table 20 below is used to mark an object which contains both DRM protected content and the associated DRM license within the same object.

TABLE 20

| Field name | Field order | Size (bytes) | Datatype | Value |
|---|---|---|---|---|
| PropertyCode | 1 | 2 | UINT16 | 0xDC90 |
| Datatype | 2 | 2 | UINT16 | 0x0004 (UINT32) |
| Get/Set | 3 | 1 | UINT8 | 0x01 (GET/SET) |
| DefaultValue | 4 | | | 0x00000000 |
| GroupCode | 5 | 4 | UINT32 | Device-defined |
| FormFlag | 6 | 1 | UINT8 | 0x00 None |

7g. Trusted Clock Property

In an embodiment, the property in table 21 below is used to define a trusted clock. A trusted clock provides added protection in that it cannot be set backwards or forwards to circumvent DRM and security restrictions.

TABLE 21

| Field name | Field order | Size (bytes) | Datatype | Value |
|---|---|---|---|---|
| PropertyCode | 1 | 2 | UINT16 | 0xXXXX |
| Datatype | 2 | 2 | UINT16 | 0xFFFF (STRING) |
| Get/Set | 3 | 1 | UINT8 | 0x01 (GET) |
| DefaultValue | 4 | | | 0x00 (Null String) |
| GroupCode | 5 | 4 | UINT32 | Device-defined |
| FormFlag | 6 | 1 | UINT8 | 0x00 None |

In an embodiment, the timestamp property in table 21, provides a string representation of a generic time stamp in extended International Organization for Standardization (ISO) 8601 date/time format as: YYYY-MM-DD-HH-MM-SS-MMM-UUU-NNN-PPP. The timestamp string format is described in table 22 below:

TABLE 22

| Place | Meaning | Range | Required |
|---|---|---|---|
| YYYY | Year | 0000 ... 2007 | Yes |
| MM | Month | 01 ... 12 | Yes |
| DD | Day | 01 ... 31 | Yes |
| HH | Hour | 01 ... 24 | Yes |
| MM | Minute | 01 ... 60 | Yes |
| SS | Seconds | 01 ... 60 | Yes |
| MMM | Milliseconds | 000 ... 999 | Optional |
| UUU | Microseconds | 000 ... 999 | Optional |
| NNN | Nanoseconds | 000 ... 999 | Optional |
| PPP | Picoseconds | 000 ... 999 | Optional |

For example, the time stamp string 2007-01-01-12-30-00 represents Jan. 1, 2007, 12:30 p.m. and 0 seconds. The time stamp string 0000-00-00-00-00-00-120-750 represents 120 milliseconds, 750 microseconds.

It is to be appreciated that the embodiments presented herein may be implemented in any existing or future protocol besides MTP including but not limited to Picture Transfer Protocol (PTP), HTTP (Hyper Text Transfer Protocol), POP3 (Post Office Protocol 3), SMTP (Simple Mail Transfer Protocol), FTP (File Transfer Protocol), IP (Internet Protocol), DHCP (Dynamic Host Configuration Protocol), IMAP (Internet Message Access Protocol), ISDN Integrated Services Digital Network, PDH Plesiochronous Digital Hierarchy, T-carrier (T1, T3, etc.), E-carrier (E1, E3, etc.), RS-232, a serial line interface originally developed to connect modems and computer terminals, SDH Synchronous Digital Hierarchy, SONET Synchronous Optical NETworking, Layer 2 protocols (Data link layer), ARCnet, CDP Cisco Discovery Protocol, DCAP Data Link Switching Client Access Protocol, Econet, Ethernet, FDDI Fiber Distributed Data Interface, Frame Relay, HDLC High Level Data Link Control, LocalTalk, L2F Layer 2 Forwarding Protocol, L2TP Layer 2 Tunneling Protocol, LAPD Link Access Procedures on the D channel, LLDP Link Layer Discovery Protocol, LLDP-MED Link Layer Discovery Protocol-Media Endpoint Discovery, PPP Point-to-Point Protocol, PPTP Point-to-Point Tunneling Protocol, SLIP Serial Line Internet Protocol, Layer 4 protocols (Transport layer), IL Originally developed as transport layer for 9P, RTP Real-time Transport Protocol, SPX Sequenced Packet Exchange, SCTP Stream Control Transmission Protocol, TCP Transmission Control Protocol, UDP User Datagram Protocol, Sinec H1 for telecontrol, Layer 5 protocols (Session layer), 9P Distributed file system protocol developed originally as part of Plan 9, NCP NetWare Core Protocol, NFS Network File System, SMB Server Message Block (aka CIFS Common Internet FileSystem), Layer 7 protocols (Application layer), AFP pple Filing Protocol, BACnet Building Automation and Control Network protocol, BitTorrent, a peer-to-peer file sharing protocol, BOOTP Bootstrap Protocol, DIAMETER, an authentication, authorization and accounting protocol, DICT Dictionary protocol, DNS Domain Name Service, DHCP Dynamic Host Configuration Protocol, FTP File Transfer Protocol, Finger which gives user profile information, Gnutella—a peer-to-peer file-swapping protocol, Gopher, a precursor of web search engines, HTTP HyperText Transfer Protocol, used in the World Wide Web, SMTP Simple Mail Transfer Protocol, SNMP Simple Network Management Protocol and SOAP Simple Object Access Protocol.

8. Example General Purpose Computer System

The present invention may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

In fact, in one embodiment, the invention is directed toward one or more computer systems capable of carrying out the functionality described herein. An example of a computer system 800 is shown in FIG. 8. In an embodiment, initiator 102 and/or responder 104 may include computer system 800 or portions of computer system 800 and be configured to perform the steps in flowcharts described herein. For example, processor 108 of initiator 102 or processor 106 of responder 104 may be processor 804 of computer system 800, and be configured to execute instructions to perform the steps in flowcharts described herein.

Computer system 800 includes one or more processors, such as processor 804. Processor 804 is connected to a communication infrastructure 806 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 800 can include a display interface 802 that forwards graphics, text, and other data from communication infrastructure 806 (or from a frame buffer not shown) for display on display unit 816.

Computer system 800 also includes a main memory 805, preferably random access memory (RAM), and may also include a secondary memory 810. Secondary memory 810 may include, for example, a hard disk drive 812 and/or a removable storage drive 814, representing a floppy disk drive, a magnetic tape drive, an optical disk drive, etc. Removable storage drive 814 reads from and/or writes to a removable storage unit 815 in a well known manner. Removable storage unit 815 represents a floppy disk, magnetic tape, optical disk, etc. which is read by and written to by removable storage drive 814. As will be appreciated, removable storage unit 815 includes a computer usable storage medium having stored therein computer software and/or data.

In alternative embodiments, secondary memory 810 may include other similar devices for allowing computer programs or other instructions to be loaded into computer system 800. Such devices may include, for example, a removable storage unit 815 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 815 and interfaces 820, which allow software and data to be transferred from removable storage unit 815 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical or other signals capable of being received by communications interface 824. These signals 828 are provided to communications interface 824 via a communications path (e.g., channel) 826. This channel 826 carries signals 828 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 814, a hard disk installed in hard disk drive 812, and signals 828. These computer program products provide software to computer system 800. The invention is directed to such computer program products.

Computer programs (also referred to as computer control logic) are stored in main memory 805 and/or secondary memory 810. Computer programs may also be received via communications interface 824. Such computer programs, when executed, enable computer system 800 to perform the features of the present invention, as discussed herein. In particular, the computer programs, when executed, enable processor 804 to perform the features of the present invention. Accordingly, such computer programs represent controllers of computer system 800.

In an embodiment where the invention is implemented using software, the software may be stored in a computer program product and loaded into computer system 800 using removable storage drive 814, hard drive 812 or communications interface 824. The control logic (software), when executed by processor 804, causes processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

9. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method to exchange data on capabilities of a Digital Rights Management (DRM) system between an initiator and a responder operating under a data transfer protocol, comprising:
   opening a session between the initiator and the responder;
   sending an operation from the initiator to the responder requesting capabilities of a DRM system deployed on the responder; and
   receiving, from the responder, in response to the operation, a dataset with the capabilities of the DRM system deployed on the responder, wherein the dataset indicates whether the DRM system deployed on the responder has a secure path for playing media content.

2. The method of claim 1, wherein the data transfer protocol is one of a Media Transport Protocol (MTP) or a Picture Transfer Protocol (PTP).

3. The method of claim 1, wherein the dataset includes one or more of a DRM system identification, a DRM capability vendor, a DRM capability version, DRM capability features, DRM capability permissions and a DRM capability status.

4. The method of claim 1, wherein the dataset indicates whether the DRM system deployed on the responder is enabled to play media content.

5. The method of claim 4, wherein the media content includes at least one of a video, a resolution of the video, audio, e-books, images, and slides.

6. The method of claim 1, wherein the dataset indicates whether the DRM system deployed on the responder is allowed to render media content.

7. The method of claim 6, wherein the media content includes at least one of a video, a resolution of the video, audio, e-books, images, and slides.

8. The method of claim 1, further comprising:
   exchanging one or more of device and system information between the initiator and the responder.

9. The method of claim 1, wherein said operation includes one or more of a second dataset, a response code, an operation parameter, and a response parameter.

10. A method to exchange data on capabilities of multiple Digital Rights Management (DRM) systems between an initiator and a responder operating under a data transfer protocol, comprising:
    opening a session between the initiator and the responder;
    sending an operation from the initiator to the responder requesting capabilities of multiple DRM systems deployed on the responder;
    receiving, from the responder, in response to the operation, a dataset with a list of the capabilities of the multiple DRM systems deployed on the responder, wherein the dataset indicates whether the DRM systems deployed on the responder have a secure path for playing media content.

11. The method of claim 10 wherein the list includes capabilities of each of the multiple DRM systems deployed on the responder.

12. The method of claim 10, wherein the data transfer protocol is one of a Media Transport Protocol (MTP) or a Picture Transfer Protocol (PTP).

13. The method of claim 10, wherein the list includes one or more DRM system capability datasets.

14. The method of claim 13, wherein each of the DRM system capability datasets includes one or more of a DRM system identification, a DRM capability vendor, a DRM capability version, DRM capability features, DRM capability permissions and a DRM capability status.

15. The method of claim 10, further comprising:
    exchanging one or more of device and system information between the initiator and the responder.

16. The method of claim 10, wherein said operation includes one or more of a second dataset, a response code, an operation parameter, and a response parameter.

17. A method to exchange information on devices that share a Digital Rights Management (DRM) system between a first device and a second device operating under a data transfer protocol, comprising:
    opening a session between the first device and the second device;
    sending an operation from the first device to the second device requesting a list of devices that operate under a management of a common DRM management entity that supports DRM content sharing between the devices; and
    receiving, from the second device, in response to the operation, a dataset including the list of devices that operate under the management of the common DRM management entity;
    wherein the common DRM management entity resisters, authenticates, and manages each device's capability to share DRM protected content between the devices.

18. The method of claim 17, wherein the devices are computational devices in a home or office network and share the DRM system.

19. The method of claim 17, wherein the data transfer protocol is one of a Media Transport Protocol (MTP) or a Picture Transfer Protocol (PTP).

20. The method of claim 17, wherein the dataset includes one or more of a partner link type, a partner link address, a partner alias name, a partner device type and partner sharing rights.

21. The method of claim 17, further comprising:
    exchanging one or more of device and system information between the initiator and the responder.

22. The method of claim 17, wherein said operation includes one or more of a second dataset, a response code, an operation parameter, and a response parameter.

23. A method to exchange Digital Rights Management (DRM) authority characteristics between an initiator and a responder operating under a data transfer protocol, comprising:
    opening a session between the initiator and the responder;
    sending an operation from the initiator to the responder requesting data on a DRM authority that registers, authenticates, and manages a capability of DRM partner devices to share DRM protected content between the DRM partner devices; and
    receiving, from the responder, in response to the operation, a DRM system identification and a dataset including characteristics of the DRM authority that indicate the capability of the DRM partner devices to share the DRM protected content between the DRM partner devices.

24. The method of claim 23, wherein the data transfer protocol is one of a Media Transport Protocol (MTP) or a Picture Transfer Protocol (PTP).

25. The method of claim 23, wherein the dataset includes one or more of an authority link type, an authority link address, an authority alias name, an authority device type and authority rights granted.

26. The method of claim 23, further comprising:
exchanging one or more of device and system information between the initiator and the responder.

27. The method of claim 23, wherein said operation includes one or more of a second dataset, a response code, an operation parameter, and a response parameter.

28. A method to exchange Digital Rights Management (DRM) security level information between an initiator and a responder operating under a data transfer protocol, comprising:
opening a session between the initiator and the responder;
sending an operation from the initiator to the responder requesting data on DRM security level information; and
receiving, from the responder, in response to the operation, a dataset including data on DRM security level information of a DRM system implemented on the responder.

29. The method of claim 28, wherein the data transfer protocol is one of a Media Transport Protocol (MTP) or a Picture Transfer Protocol (PTP).

30. The method of claim 28, wherein the dataset includes one or more of secure boot data, trusted clock data, device class data, cryptography hardware capabilities, secure components data, orange book level, device public key data, trusted authority address data and device address data.

31. A method to exchange Common Criteria Evaluation and Validation Scheme (CCEVS) data between an initiator and a responder operating under a data transfer protocol, comprising:
opening a session between the initiator and the responder;
sending an operation from the initiator to the responder requesting CCEVS data for a CCEVS system deployed on the responder; and
receiving, from the responder, in response to the operation, a dataset with the CCEVS data for the CCEVS system deployed on the responder and whether a Digital Rights Management (DRM) system deployed on the responder is allowed to render media content.

32. The method of claim 31, wherein the data transfer protocol is one of a Media Transport Protocol (MTP) or a Picture Transfer Protocol (PTP).

33. The method of claim 31, wherein the dataset includes one or more of a technology type, a profile name, a conformance claim, a protection profile version, an abbreviation sponsor and dates.

34. The method of claim 31, further comprising:
exchanging one or more of device and system information between the initiator and the responder.

35. The method of claim 31, wherein said operation includes one or more of a second dataset, a response code, an operation parameter, and a response parameter.

36. A method to exchange data on multiple Common Criteria Evaluation and Validation Scheme (CCEVS) systems between an initiator and a responder operating under a data transfer protocol, comprising:
opening a session between the initiator and the responder;
sending an operation from the initiator to the responder requesting a list of multiple CCEVS systems deployed on the responder; and
receiving, from the responder, in response to the operation, a dataset with the list of the multiple CCEVS systems deployed on the responder and whether a Digital Rights Management (DRM) system deployed on the responder is allowed to render media content.

37. The method of claim 36, wherein, the list includes datasets for each of the multiple CCEVS systems deployed on a responder.

38. The method of claim 36, wherein the data transfer protocol is one of a Media Transport Protocol (MTP) or a Picture Transfer Protocol (PTP).

39. The method of claim 36, wherein the list includes CCEVS protection profiles for each CCEVS system deployed on the responder.

40. The method of claim 39, wherein each of the CCEVS protection profiles includes one or more of a technology type, a profile name, a conformance claim, a protection profile version, an abbreviation sponsor and dates.

* * * * *